United States Patent Office 3,489,687
Patented Jan. 13, 1970

3,489,687
DEHYDRATION OF AMINE OXIDES
Jack Thomas Inamorato, Flushing, N.Y., and George Francis Marion, Paramus, N.J., assignors to Colgate-Palmolive Company, New York, N.Y., a corporation of Delaware
No Drawing. Filed Oct. 21, 1965, Ser. No. 500,205
Int. Cl. C11d 3/30
U.S. Cl. 252—137      4 Claims

ABSTRACT OF THE DISCLOSURE

A process for the dehydration of an aqueous solution of a thermally sensitive surface-active higher alkyl, lower dialkyl amine oxide said higher alkyl containing from about 10 to about 20 carbon atoms said lower alkyl containing from about 1 to about 3 carbon atoms which comprises mixing the aqueous solution with a solid, hydratable inorganic salt e.g., sodium sulfate, said salt being employed in amounts sufficient to react with substantially all the water in said solution. The products of the hydration mixture are obtained directly as a friable mass which can be easily granulated to form an effective free-flowing built detergent composition.

---

This invention relates to the treatment of amine oxides, more particularly to the treatment of aqueous solutions of tertiary amine oxides having hydropholic higher aliphatic substituents.

The tertiary amine oxides are a well known class of materials having the general formula $$R'NR^3_2$$
$$\downarrow$$
$$O$$

(with $R^2$)

where each of the R groups may be a monovalent radical attached to the nitrogen by a carbon-to-nitrogen single bond. Amine oxides used for detergent purposes generally contain at least one aliphatic hydrocarbon substituent of about 8 or more carbon atoms. The amine oxide need not be acyclic; the nitrogen atom may, for example, be part of a heterocyclic ring in which case the $R^2$ and $R^3$ for example, may constitute together a single divalent radical. Also, the amine oxide may contain more than one amine oxide group; for example, the $R^3$ radical may carry another amine oxide group.

In the manufacture of amine oxides it is conventional to produce the amine oxide in aqueous medium. For example, a solution of a tertiary amine in ethanol may be treated with a peroxidizing agent such as peracetic acid or aqueous hydrogen peroxide (e.g. in 30% concentration and at a temperature of 50–60° C.) followed by dilution with water, extraction of unreacted amine as with petroleum ether, and evaporation of the alcohol. The higher amine oxides are highly sensitive to heat and if it is desired to recover them from their aqueous solution (e.g. for the manufacture of solid detergent compositions), it has been necessary to resort to such expensive and difficult process as freeze drying or similar procedures; this is illustrated, for example, in United States Patents 2,302,714 and 3,197,509.

One aspect of this invention relates to a novel process for dehydrating aqueous amine oxides solutions in a highly economical manner. Another aspect of this invention relates to the production of dried solid built detergent compositions of amine oxides and inorganic salts, efficiently and inexpensively. It has now been found that this may be accomplished by mixing the aqueous solution of the amine oxide with a hydratable inorganic salt, whereby there is a chemical hydration reaction between the amine oxide solution and the salt. Although this reaction results in heating of the mixture of reactants, it is found that the detergent efficacy of the amine oxide is substantially retained. In addition, the products of the hydration mixture are obtained directly as a friable mass which can be easily granulated to form an effective free-flowing built detergent composition.

Examples of tertiary amine oxides which may be used are such materials as the higher alkyl di (lower alkyl) amine oxides (e.g. having a higher alkyl group of about 10 to 20, preferably 12 to 18, carbon atoms and a lower alkyl group of 1 to 3 carbon atoms) e.g. lauryl dimethyl amine oxide or tallow-dimethyl amine oxide. One or more of the lower alkyl groups may be replaced by lower hydroxyalkyl groups (e.g. a hydroxyethyl group) as in lauryl di (hydrooxyethyl) amine oxide or by amide groups (e.g. amido lower alkyl groups) as in the compound $$C_{14}H_{29}-N(CH_2-CONH_2)_2$$
$$\downarrow$$
$$O$$

The long chain alkyl group may be connected to the nitrogen through an intermediate linkage such as an amide linkage or an ester linkage as in the compounds $$(CH_3)_2N-CH_2CH_2CONHC_{12}H_{25}$$
$$\downarrow$$
$$O$$

and

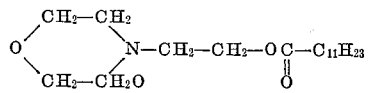

Other higher amine oxides are disclosed in the aforementioned patents and in the articles by Lake and Hoh, Journal of America Oil Chemists Society 40 628–631 (1963) and Jungermann and Ginn, Soap and Chemical Specialties 40 59–62 (1964).

As the hydratable salt there may be employed such materials as inorganic sulfates, phosphates including polyphosphates (e.g. tripolyphoshpates and pyrophosphates) and sesquicarbonates. Specific examples are sodium sulfate, sodium tripolyphosphate, tetrasodium pyrophosphate, sodium sesquicarbonate, potassium pyrophosphate and other appropriate potassium salts of these anions, or mixtures thereof.

The hydratable salts are preferably supplied in finely divided form and are mixed directly with the aqueous solution of the amine oxide; the latter solution may have a concentration in the range, for example, of about 20% to 50% (preferably about 30–40%). The amount of hydratable salts is advantageously at least sufficient to react with substantially all the water in the amine oxide solution. Advantageously, there are used about 5 to 10 parts of salt per part of amine oxide. It is found that the higher amine oxide solution and the finely divided salt generally form at first an easily workable dough-like mass. When allowed to set (e.g. for ½ hour or less) the mass becomes semi-crystalline in nature; it is friable and easily broken up into powder. The powder may be used directly as a detergent composition (e.g. as a heavy duty laundry detergent).

The following examples are given to illustrate this invention further:

EXAMPLE 1

50 parts of finely divided sodium tripolyphosphate (in the form of tiny beads), and 16 parts of finely divided crystalline anhydrous sodium sulfate were blended together and then 34 parts of a 30% aqueous solution a higher alkyl dimethyl amine oxide (in which the higher alkyl group contained a mixture of lauryl and myristyl radicals) were mixed into the blend of dry salts. A dough-like pasty mass was produced (and the temperature of the mixture rose to about 35° C.). The mixture was allowed to stand for about ½ hour and set to a soft mass of adhering friable granules, which could be easily pressed to form tablets. When the process was repeated without the amine oxide, there was formed a slurry which changed, on setting, to a brick-like hard solid which was very difficult to break up.

EXAMPLE 2

Example 1 was repeated except that the amount of sodium tripolyphosphate was 60 parts. Similar results were obtained.

EXAMPLE 3

Example 1 was repeated using 60 parts of the tripolyphosphate, 15 parts of the sodium sulfate and 25 parts of a 40% solution of stearyl dimethyl amine oxide. Similar results were obtained. The product of this example showed good detergent performance but produced substantially less foam than the high-foaming detergent products of Examples 1 and 2.

Unlike dry-blended mixtures of amine oxide and the builder salt, the products produced by the process of this invention comprise fine particles each containing both the salt and the amine oxide in intimate adherent contact.

In this specification and claims all parts are by weight unless otherwise indicated.

Although the present invention has been described with reference to particular embodiments and examples, it will be apparent to those skilled in the art that variations and modifications can be substituted therefor without departing from the principles and true spirit of the invention.

What is claimed is:

1. A process for the dehydration of an aqueous solution of a thermally sensitive surface active higher alkyl, lower dialkyl amine oxide said higher alkyl containing from about 10 to about 20 carbon atoms said lower alkyl containing from about 1 to about 3 carbon atoms which comprises mixing said aqueous solution with a solid, hydratable inorganic salt selected from the group consisting of sulfates and phosphates said salt being present in amounts sufficient at least to react with all the water in said solution by hydration.

2. Process as set forth in claim 1 in which said salt is a mixture of sodium sulfate and sodium tripolyphosphate and said amine oxide is a higher alkyl dimethyl amine oxide of about 10 to 20 carbon atoms in the higher alkyl group.

3. Process as set forth in claim 2 in which there are about 5 to 10 parts of salt per part of amine oxide.

4. A product of the process of claim 1 said product comprising fine particles each containing both the salt and the amine oxide in intimate adherent contact.

References Cited

UNITED STATES PATENTS

| | | |
|---|---|---|
| 3,047,579 | 7/1962 | Witman. |
| 3,267,147 | 8/1966 | Sheeran. |
| 3,330,327 | 7/1967 | Kennedy et al. |
| 3,334,049 | 8/1967 | Versen _____ 252—137 X |
| 3,341,459 | 9/1967 | Davis _____ 252—137 |

CHARLES B. PARKER, Primary Examiner

RICHARD L. RAYMOND, Assistant Examiner

U.S. Cl. X.R.

252—152; 260—583